(12) United States Patent
Vimalchand et al.

(10) Patent No.: US 9,242,220 B2
(45) Date of Patent: Jan. 26, 2016

(54) DISPERSED BUBBLE REACTOR FOR ENHANCED GAS-LIQUID-SOLIDS CONTACT AND MASS TRANSFER

(75) Inventors: Pannalal Vimalchand, Birmingham, AL (US); Guohai Liu, Birmingham, AL (US); WanWang Peng, Birmingham, AL (US); Alexander Bonsu, Birmingham, AL (US)

(73) Assignee: SOUTHERN COMPANY, Birmingham, AL (US)

( * ) Notice: Subject to any disclaimer, the term of this patent is extended or adjusted under 35 U.S.C. 154(b) by 866 days.

(21) Appl. No.: 13/402,908

(22) Filed: Feb. 23, 2012

(65) Prior Publication Data

US 2012/0216680 A1      Aug. 30, 2012

Related U.S. Application Data

(60) Provisional application No. 61/446,870, filed on Feb. 25, 2011.

(51) Int. Cl.
*B01J 8/22*      (2006.01)
*B01D 53/18*      (2006.01)
(Continued)

(52) U.S. Cl.
CPC .................. *B01J 8/228* (2013.01); *B01D 53/18* (2013.01); *B01D 53/62* (2013.01); *B01J 8/1827* (2013.01);
(Continued)

(58) Field of Classification Search
CPC ....................................................... B01J 8/1872
See application file for complete search history.

(56) References Cited

U.S. PATENT DOCUMENTS 3,630,848 A * 12/1971 Lefrancois ............. C12M 23/02
                                                                 435/243
5,342,781 A *  8/1994 Su ........................... C12M 27/20
                                                                 210/194
(Continued)

FOREIGN PATENT DOCUMENTS

DE            3331993         3/1984
WO        2011006059         1/2011

OTHER PUBLICATIONS

Young, Mark A. et al., "Airlift Bioreactors: Analysis of Local Two-Phase Hydrodynamics", AIChE Journal, vol. 37, No. 3, Mar. 1991, pp. 403-428.

(Continued)

*Primary Examiner* — Duane Smith
*Assistant Examiner* — Stephen Hobson
(74) *Attorney, Agent, or Firm* — Troutman Sanders LLP; Ryan A. Schneider; Dustin B. Weeks

(57)      ABSTRACT

An apparatus to promote gas-liquid contact and facilitate enhanced mass transfer. The dispersed bubble reactor (DBR) operates in the dispersed bubble flow regime to selectively absorb gas phase constituents into the liquid phase. The dispersion is achieved by shearing the large inlet gas bubbles into fine bubbles with circulating liquid and additional pumped liquid solvent when necessary. The DBR is capable of handling precipitates that may form during absorption or fine catalysts that may be necessary to promote liquid phase reactions. The DBR can be configured with multistage counter current flow sections by inserting concentric cylindrical sections into the riser to facilitate annular flow. While the DBR can absorb $CO_2$ in liquid solvents that may lead to precipitates at high loadings, it is equally capable of handling many different types of chemical processes involving solids (precipitates/catalysts) along with gas and liquid phases.

25 Claims, 4 Drawing Sheets

(51) Int. Cl.
*B01D 53/62* (2006.01)
*B01J 8/18* (2006.01)
*B01J 19/18* (2006.01)
*B01D 53/14* (2006.01)

(52) U.S. Cl.
CPC .............. *B01J 8/1836* (2013.01); *B01J 8/1872* (2013.01); *B01J 19/1881* (2013.01); *B01D 53/1475* (2013.01); *B01D 2251/206* (2013.01); *B01J 2208/00141* (2013.01); *B01J 2208/00548* (2013.01); *B01J 2219/00083* (2013.01); *B01J 2219/00164* (2013.01); *B01J 2219/00182* (2013.01); *B01J 2219/00247* (2013.01); *Y02C 10/04* (2013.01); *Y02C 10/06* (2013.01); *Y02P 20/152* (2015.11)

(56) References Cited

U.S. PATENT DOCUMENTS

| | | | | |
|---|---|---|---|---|
| 5,560,900 | A * | 10/1996 | Gbordzoe | C01B 3/344 252/373 |
| 5,578,093 | A * | 11/1996 | Campbell | B01D 53/52 422/144 |
| 6,689,845 | B1 * | 2/2004 | Govoni | B01J 8/1863 422/132 |
| 7,655,138 | B2 * | 2/2010 | Hoover | C10G 45/06 208/173 |
| 7,771,585 | B2 * | 8/2010 | Vimalchand | B01D 45/12 208/113 |
| 7,842,126 | B1 * | 11/2010 | Dilmore | B01D 53/1475 423/225 |
| 7,955,403 | B2 * | 6/2011 | Ariyapadi | C10J 3/00 423/648.1 |
| 8,696,792 | B2 * | 4/2014 | Henningsen | B01D 53/08 422/144 |
| 8,888,875 | B2 * | 11/2014 | Ramamurthy | C10J 3/78 48/197 R |
| 2009/0148930 | A1 * | 6/2009 | Gal | B01D 53/62 435/264 |
| 2010/0092368 | A1 * | 4/2010 | Neumann | B01D 53/62 423/437.1 |
| 2011/0005395 | A1 * | 1/2011 | Vimalchand | B01D 53/08 96/146 |
| 2011/0020207 | A1 * | 1/2011 | Siegert | B01J 8/0055 423/375 |
| 2011/0027132 | A1 * | 2/2011 | Nukumi | C10J 3/482 422/146 |

OTHER PUBLICATIONS

International Search Report and Written Opinion dated Jul. 2, 2012 for related PCT Application No. PCT/US2012/026106.

* cited by examiner

DISPERSED BUBBLE REACTOR FOR ENHANCED GAS-LIQUID-SOLIDS CONTACT AND MASS TRANSFER

CROSS-REFERENCE TO RELATED APPLICATIONS

This application claims the benefit of U.S. Provisional Application No. 61/446,870 filed 25 Feb. 2011, the entire contents and substance of which are hereby incorporated by reference.

STATEMENT REGARDING FEDERALLY SPONSORED RESEARCH OR DEVELOPMENT

This invention was made with Government support under Cooperative Agreement Number DE-NT0000749 awarded by the United States Department of Energy. The United States government has certain rights in the invention.

BACKGROUND OF THE INVENTION

1. Field of the Invention

The present invention relates generally to reactors involving gas-liquid-solid phases, and more particularly to a dispersed bubble reactor (DBR) that removes $CO_2$ from gas streams through enhanced gas-liquid contact and mass transfer, which DBR is capable of handling relatively fine solid particles with relatively high throughputs.

2. Description of Related Art

Conventional gas-liquid contacting equipment in practice includes trickle-bed or packed towers, tray towers, venturi scrubbers, bubble column reactors and cyclonic contactors. Yet, these types of contacting equipment have limitations, including that none can achieve at least 90% $CO_2$ capture efficiency handling precipitated solids.

For example, they cannot handle large volumes of gas such as in an integrated gasification combined cycle (IGCC) process, and in the flue gas $CO_2$ removal process from a power plant. Shared characteristics of these processes are extremely large overall gas volumetric flow rates, and high $CO_2$ concentrations in the gas-typically in the range of 10-50 percent (%) by vol %.

A case in point is the $CO_2$ in the flue gas from a coal fired pulverized coal combustion (PCC) power plant, where the $CO_2$ production rate is in the range of 1,600 to 2,200 pounds (lbs) for each megawatt-hour (MWh) of power generated. The best-known chemical solvent for this application is a monoethanol amine (MEA) and water solution mixture. The working (absorption) capacity of a 30 weight % MEA solution is in the range of 0.15 to 0.25 mol $CO_2$/mol MEA. This relatively limited working capacity range dictates that for each pound of $CO_2$ absorbed, 18 to 30 lbs of solution must be circulated between the absorber and the regenerator. Thus, for a 1,000 MW power plant, the required solution circulation rate is significant, and on the order of 30 to 66 million pounds per hour (lbs/hr), or 70,000 to 140,000 gallons per minute (gal/min). The flue gas production rate from such a plant is more than 2 million cubic feet per minute.

Such large gas and liquid flow rates create design challenges with conventional gas absorption technologies. Due to limitations in gas velocity, the packed bed or tray tower absorber requires an extremely large tower diameter (over 100 feet (ft) in inner diameter) if a single tower design is attempted.

Furthermore, the unprecedented size of a single tower, in and of itself, presents extraordinary challenges in uniformly distributing gas and liquid throughout the cross-section of a packed-bed absorber. The sheer size of the trays would make the tray tower implausible to design. If one were to implement a multiple tower design, the equipment required for distribution of the gas and liquid to the different towers is prohibitively expensive, as is the cost as a whole, escalating with each additional tower.

Particulates and solvents also present design hurdles. For most conventional solvents, particulates in the solution can lead to operational problems, such as foaming in the absorber. Severe operational consequences arise when the particulates deposit in the voids and cause blockages in the packing, as solvent flow becomes restricted. Conventional designs employ filters in an attempt to remove particulates in the circulating solvent that result from degrading solvent or corrosion product.

Solvents, operating conditions and working ranges carefully are chosen in conventional designs to minimize forming precipitating particulates due to absorption and reaction. Yet, conventional equipment severely limits the solvent choices and working ranges useful in the system, and specifically detrimental in improving $CO_2$ capture process performance.

Large solvent circulation rates in the range of 30 to 66 million lbs/hr between the absorber and the regenerator with conventional processes necessitate significantly large amounts of steam energy to heat the solution in the regenerator. Over 25% of power generation is lost as a result both as energy is consumed by the solvent circulation pumps, and as steam is diverted from the steam turbine to regenerate the solvent.

In $CO_2$ capture systems, it is highly desirable to have solids precipitate out from the solvent solution upon $CO_2$ absorption and reaction in order to reduce the energy consumption with solvent circulation and rich solution regeneration process. One such analysis (Yeh, J. T. et al., Absorption and Regeneration Studies for $CO_2$ Capture by Aqueous Ammonia, Third Annual Conference on Carbon Capture & Sequestration, May 3-6, 2004, Alexandria, Va., USA ("Yeh")) shows that the lowest regeneration energy consumption can be achieved when the absorption and regeneration cycles can be represented with the following chemical reaction (1):

$$(NH_4)_2CO_3 + CO_2 + H_2O \Longleftrightarrow 2NH_4HCO_3 \quad (1)$$

Ammonium carbonate solution, which has relatively high solubility in water, is used to absorb $CO_2$ to form ammonium bicarbonate, which has a relatively low solubility and therefore precipitate out from the solution in the absorber.

If the absorber is packed with internals such as structured packing materials and distributors, the ammonium bicarbonate precipitates can deposit onto the packing and render the tower in-operable due to plugging. Yeh observed that ammonium bicarbonate can plug the pores of the sintered metal sparger in laboratory testing, even in spite of the $CO_2$ flowing through the sparger. Hence, one can expect severe plugging problems with the packing material in the tower due to the low gas and liquid velocities, and to the existence of stagnant regions within the packing.

Similar problems due to plugging of passageways by solids in tray column absorbers are known. Another analysis (Brower, et al., Amino-acid Salts for $CO_2$ Capture from Flue Gas, ) shows that solids precipitation is highly desirable to increase the amino acid salt solution $CO_2$ capture capacity, and to minimize overall energy needs of the $CO_2$ capture process. For such solvent solutions that can cause solids precipitation, the conventional packed and tray towers will be unsuitable for $CO_2$ absorption.

Venturi scrubbers and cyclonic spray type contactors can minimize or avoid internal packing, and potentially avoid problems associated with solids precipitation and deposition. A major characteristic of these types of contactors is the short contacting time, generally less than one second. However, for most known $CO_2$ absorption solvents, the required gas-solvent contacting times are much longer. U.S. Pat. No. 7,862,788 to Gal et al. discloses that with 11 ft of packing, and even with piperazine as a promoter, the $CO_2$ capture efficiency is relatively low in a range of approximately 15% to 72% and, without the promoter, in a range of approximately 8% to 35% within the ammonium carbonate and bicarbonate regeneration cyclone ($NH3/CO_2$ molar ratio less than two). Gal et al. illustrates that the contacting time is insufficient. Therefore, venturi scrubbers and cyclonic spray type contactors cannot satisfy the long residence requirements to achieve at least 90% $CO_2$ capture efficiency.

U.S. Pat. No. 5,342,781 to Su discloses an air-lift or bubble column reactor that can handle solids, and has a long gas-solids residence time. However, this type of the reactor has very low gas flow rates, and gas hold-up and the gas superficial velocity is generally less than 3 feet per second (ft/s). Low gas velocities means large reactor size, and at such low gas velocities, the reactor size must be sufficiently large to handle the large amounts of the flue gas from a power plant.

Further, as the $CO_2$ absorption reaction is exothermic, it is necessary to remove the exothermic heat to maintain a low absorption temperature. With air-lift or bubble column reactors, low gas and solvent velocities make it difficult to remove the exothermic heat from the reaction zones. Even large air-lift or bubble column reactors, or multiple smaller reactors in combination, lead to a variety of problems, including poor gas and solvent flow distribution, channeling, inadequate heat dissipation and an inability to operate at low stable absorption temperatures.

A further challenge presented to successful systems that remove $CO_2$ from flue gas is the allowable pressure drop or the power consumption in blowing the flue gas through the absorber due to the large volume. Such blowers consume large power even for small increases in pressure. Studies shows that the $CO_2$ capture from a power plant can reduce the overall plant efficiency by approximately 9%, or in a relative scale by about 25% (see, http://www.fwc.com/publications/tech_papers/files/TP_CCS_10_04.pdf). Absorber designs have little margin for improvements in lowering the pressure drop.

In spite of the many challenges above, beneficial $CO_2$ removal process incorporates contacting syngas from an IGCC process, or flue gas from a conventional PCC power plant, with a liquid solvent. Even with such gas-liquid contact systems, problems remain if cost and efficiency improvements are desired.

With some liquid solvents, high degrees of saturation with $CO_2$ lead to formation of precipitates (crystals). Most gas-liquid contactors are incapable of handling precipitated solid particles. Other gas-liquid contactors do not have sufficiently long residence times to accommodate the relatively slower $CO_2$ capture kinetics.

The inherently large size of conventional contactors for power plant presents design challenges in achieving uniformity throughout the cross-section. For some solvents, the solvent working (absorption) capacities need to be limited to avoid forming precipitates that can lead to operational difficulties with the conventional contactors. Such limitations on the working capacities of the solvent necessitate higher parasitic energy consumption during regeneration and solvent circulation between the absorber and the regenerator. As a result, conventional gas-liquid contactors, and the processes used therein, are too inefficient and too capital intensive to be useful in capturing $CO_2$ from an IGCC process or from flue gas in a coal combustion plant for power generation.

What are needed are cost effective and reliable solutions for processing relatively large volumes of gases in relatively small reactors while also capable of handling precipitates formed in the process. It is to such systems and methods that the present invention is primarily directed.

BRIEF SUMMARY OF THE INVENTION

Briefly described, in a preferred form, the present invention is a mass transfer system using a concentration gradient between two streams as the driving force for diffusion and possibly subsequent chemical reaction. Mass transfer is the net movement of mass from one location, usually meaning a stream, phase, fraction or component, to another. In industrial processes as disclosed herein, mass transfer operations include, for example, separation of chemical components in absorbers such as scrubbers with packed or tray columns. Mass transfer is often coupled to additional transport processes, for instance in systems with exothermic chemical reactions. In such systems, coupling heat transfer to mass transfer allows removal of exothermic heat and thus maintain a steady operating temperature.

In a preferred embodiment, a circulating liquid stream is continually enriched with at least a portion of, and then stripped of at least a portion of, a detrimental species. The first stream becomes enriched with the detrimental species when it mixes with the inlet gas stream of the present invention, being a detrimental species-rich industrial process/effluent stream (for example, syngas from an IGCC process, or flue gas from a conventional PCC power plant). When the circulating liquid stream becomes sufficiently saturated with the detrimental species, and in some instances, precipitates, the detrimental species-rich circulating liquid stream can be sent to a regeneration unit that upon regeneration, returns a detrimental species-lean circulating liquid stream to the system.

In a preferred embodiment, the first stream in a standpipe is a circulating liquid stream combined with syngas from an IGCC process, or flue gas from a conventional PCC power plant, with the detrimental species comprising $CO_2$, that upon mixing, forms the second stream. The second stream in a riser is of lower density than the first stream via the introduction of finely dispersed gas bubbles that enhances the gas-liquid contact and mass transfer through the creation of a large interfacial area between the gas bubbles from the inlet stream and the first stream (forming the second stream). A portion of the $CO_2$ species in the finely dispersed gas bubbles is absorbed by the circulating liquid stream.

The second stream passing through the riser then can be separated into components, in a preferred embodiment, its gas and liquid components, wherein the gas component exiting the riser contains much less detrimental species/$CO_2$ than the inlet gas stream, and the liquid component returned to the system via the standpipe, to move through the system once again as the circulating liquid stream component of the first stream.

In an exemplary embodiment, the present invention is a dispersed bubble reactor (DBR) that removes $CO_2$ from gas streams through enhanced gas-liquid contact and mass transfer. The present DBR is capable of handling relatively fine solid precipitates formed in the process, while processing relatively large volumes of gases.

While the term dispersed bubble reactor may be used in the present application as, for example, a "reactor" for applications such as Fischer-Tropsch synthesis, the term is not so restrictive, as the present invention can also be an "absorber" in a different sense of the word, as it focuses on absorbing, for example, $CO_2$. One of skill in the art will appreciate when the present invention is perhaps better defined as a reactor, than an absorber, and vice versa.

The present invention can use the energy from a circulating liquid solution in the riser/absorber to induct the gas phase. The liquid phase has a much smaller volume per unit mass, and thus can gain much higher pressure differences with similar power consumption as that needed to compress the gas. The present invention is a DBR apparatus improving upon conventional gas-liquid contactors.

The present invention has important applications with catalytic processes in the chemical industry that involve gas, liquid and solid phases. Examples of multiphase reactors include, but are not limited to, hydro-processing of coal-derived liquids and petroleum oils and Fischer-Tropsch synthesis. The present invention provides for effective mass and heat transfer as well as mixing patterns necessary to achieve improved reactor performance through higher catalyst efficiency and selectivity in chemical processes that involve gas, liquid and solid phases.

An exemplary DBR is configured to circulate the liquid phase in either an atmospheric or pressurized environment. Such configurations produce finely dispersed gas bubbles that enhance gas-liquid contact and mass transfer through creation of a large interfacial area between the gas bubbles and the liquid. In addition, the present invention also provides a significantly high liquid-to-gas ratio in the riser, which increases the absorption rate of the gas phase into the liquid phase. The high liquid-to-gas ratio (in the range of approximately 10 to 100) also facilitates a low uniform riser temperature, further enhancing the absorption.

A preferred DBR can handle precipitates formed during the absorption of a gas phase constituent ($CO_2$, for example) and subsequent reaction in the liquid phase, as well as catalyst particles that may be necessary to catalyze liquid phase reactions in other chemical processes. The present configuration of the system reduces the size of the equipment over conventional systems, as the DBR is designed to handle high throughputs as an absorber or reactor operating at up to a 40 ft/sec superficial gas velocity. With superficial gas velocities in the range of approximately 10 to 40 ft/sec, the internally circulating liquid velocities range from approximately 12 to 30 ft/sec. In an exemplary embodiment of the present invention, the operating pressures can range as necessary, from essentially atmospheric to higher pressures dictated by a particular process.

In most disclosed embodiments, the present invention is described with particular application to $CO_2$ absorption from pre-combustion syngas generated and used in an IGCC process or post combustion process to capture $CO_2$ from the flue gas from a PCC power plant. Yet one of skill in the art can adapt the present invention to other three phase applications, such as Fischer-Tropsch synthesis, direct coal liquefaction and hydro-processing with variations favorable to the process for product removal and catalyst recovery.

A preferred DBR comprises essentially a co-current flow reactor, but without the conventional complicated internals such as packing materials, tray plates and associated internal distributors and collectors found in traditional mass transfer units. However, in another DBR embodiment, the system comprises essentially a counter-current flow reactor without additional complicated internals.

The present DBR offers an efficient gas-liquid contacting mass transfer device, preferably for systems processing large streams of gas. The present DBR can be effectively used in large scale IGCC systems operating at high pressures for pre-combustion $CO_2$ capture (separation) from syngas with a regenerable medium of solvents, including those that form precipitates upon simultaneous absorption and reaction. It can also capture $CO_2$ from a PCC power plant flue gas operating at essentially ambient pressure.

In the present system, $CO_2$ in the gas phase is absorbed in the liquid phase. When the liquid solution becomes sufficiently saturated with $CO_2$, the 'rich' solution including precipitates, if any, is sent to the regeneration unit that operates at a relatively higher temperature. Regenerated 'lean' solution then returns to the absorption unit.

The heat of reaction from $CO_2$ absorption or exothermic heat from other applications, such as the Fischer-Tropsch synthesis, can be handled with heat transfer surfaces imbedded in the downcomer or riser of the DBR to remove heat from the reactor, and therefore control and maintain near uniform operating temperatures in the system.

The present DBR can also separate precipitates generated from liquid phase reactions. In the case of $CO_2$ absorption, a concentrated stream of precipitated solids as a slurry can be sent to the regenerator to restore the absorption capacity of the solvent.

The presence of solids in the present DBR circulating loop increases gas hold-up compared to gas-liquid systems at similar superficial gas velocities. The dispersion in the present DBR produces fine bubbles, preferably in a mean size range of approximately 100 to 500 microns (depending upon the characteristics of the solvent) in the riser portion of the DBR, with a void fraction in the range of approximately 0.2 to 0.8. Such small bubble sizes and high void fractions result in relatively large interfacial areas between the gas and liquid phases, thus enhancing mass transfer.

Larger void fraction in the riser leads to lower density, and the larger density difference between the standpipe and riser in the present DBR apparatus promotes higher liquid (or slurry) circulation rates. The higher circulation rates increase the liquid-to-gas flow rate (L/G) ratio in the riser, which further enhances mass transfer and moderates temperature increase due to beneficial heat transfer.

In another preferred embodiment, the present invention is a dispersed bubble reactor for selective absorption of a gas phase constituent into the liquid phase operating at a dispersed bubble flow regime comprising a riser where dispersed gas contacts a circulating liquid stream comprising a gas phase constituent, wherein in the riser, at least a portion of the gas phase constituent is absorbed into a liquid phase, the lower portion of the riser having a dispersion zone where the dispersed gas bubbles are generated, a cyclone, wherein the circulating liquid stream with the gas phase constituent from the riser is separated into a separated liquid stream and a separated gas stream, a standpipe where the separated liquid stream from the riser is collected, the standpipe having a bottom portion for concentrating solid precipitates, a non-mechanical valve connecting the standpipe with the riser, and a riser crossover connecting the riser with the cyclone. The concepts of the cyclone can be based on a presalter cyclone.

An industrial process or effluent stream containing the gas phase constituent (the $CO_2$-rich inlet gas stream of the DBR) is combined with the separated liquid stream from the standpipe in a dispersion zone of the riser. In a preferred embodiment, the gas phase constituent is $CO_2$. Preferably, the reactor removes over approximately 90% of the $CO_2$ in the industrial stream, such that the separated liquid stream returning to the standpipe from the cyclone contains the absorbed $CO_2$ and continues to be enriched with, and then stripped of, $CO_2$ via the regenerator.

The detrimental species-rich inlet gas stream can enter the riser with a velocity in the range of approximately 10-40 ft/s, and the circulating liquid stream with the gas phase constituent moves through the riser at a velocity in the range of approximately 12-30 ft/s. The relatively dense phase column of circulating liquid stream in the standpipe can provide the necessary static head to drive the liquid flow into the riser as well as maintain the liquid circulation around the system.

The dispersion zone of the riser is located at the bottom of the riser, and is a portion of the riser having a larger diameter than higher regions of the riser, such that the ratio of diameters of the dispersion zone section of the riser to the higher regions of the riser is in the range of approximately 1.2 to 5.

The liquid velocities entering the dispersion zone of the riser generate a shearing force for dispersion of larger gas bubbles into smaller gas bubbles, and the degree of dispersion is controllable by controlling the static head of the liquid column in the standpipe. The system can further comprise a pump to pump liquid from the standpipe into the dispersion zone of the riser, which provides additional dispersive shear force in the dispersion zone.

In the dispersion zone, liquid flow from tangentially entering jets forms a rotating pool of the circulating liquid stream that can generate enough shear force to break the incoming dispersed gas stream (the $CO_2$-rich inlet gas stream) into finely dispersed bubbles in the mean range of approximately 100 to 500 microns in size. In the dispersion zone, the dispersed gas bubbles can mix in the circulating liquid stream with a void fraction in the range of approximately 0.2 to 0.8. The void fraction reduces the density of the circulating liquid stream with the gas phase constituent in the riser, and thus increases the density difference between the material in the standpipe and riser, further complementing the driving force circulating the circulating liquid stream in the reactor.

The circulating liquid stream with the gas phase constituent in the riser can have a liquid-to-gas flow rate ratio in the range of approximately 10 to 100.

The system can further comprise a heat adjustment system to provide controlled system temperature by adding or removing heat from the circulating liquid stream. The heat adjustment system can provide heat transfer in one or both of the standpipe and riser to provide controlled system temperature by adding or removing heat from the circulating liquid stream with heat transfer surfaces within the one or both standpipe and riser.

The present system can handle a circulating liquid stream comprising solid particles in the form of precipitates formed during the absorption process of a three phase dispersed bubble flow regime operation. The precipitates in the circulating liquid stream enhance dispersion. At least a portion of the precipitates can collect in the bottom portion of the standpipe, preferably via gravity separation. The dispersed bubble reactor can be in communication with a regenerator, wherein concentrated slurry of precipitated solid particles flows to the regenerator to become a regenerated lean solvent stream. At least a portion of finer precipitates can flow back to the riser and act as seed crystals for further precipitate growth. The regenerated lean solvent stream from the regenerator can be injected into the non-mechanical valve to be recirculated into the riser.

The dispersed gas enters the bottom of the riser at an elevation higher than that of the bottom of the standpipe, limiting or preventing gas from entering the standpipe. Further, the non-mechanical valve limits or prevents gas from the riser from reverse flow into the standpipe.

The circulating liquid stream from the non-mechanical valve can tangentially enter the dispersion zone.

The riser crossover can provide initial separation of the circulating liquid stream with the gas phase constituent from the riser into a separated liquid stream and a separated gas stream before entering the cyclone.

The riser can be provided with annular regions, and the reactor provided with downwardly-inclined liquid solvent jets injecting solvent streams into the annular region with sufficient momentum to overcome the friction force between the rising circulating liquid stream comprising the gas phase constituent and walls that form the annular region. The liquid solvent streams from the downwardly-inclined liquid solvent jets can generate a countercurrent flow effect in the riser, increasing the $CO_2$ absorption efficiency.

In another preferred embodiment, the present invention is a system for selective absorption of a detrimental species from a detrimental species-rich inlet gas stream comprising a detrimental species-rich inlet gas stream, a dispersion zone where the inlet gas is introduced to a circulating liquid stream, wherein at least a portion of the detrimental species is absorbed by the circulating liquid stream forming an enriched circulating liquid stream having a liquid-to-gas flow rate ratio in the range of approximately 10 to 100, and wherein the circulating liquid stream velocity entering the dispersion zone generates a shearing force for dispersion of larger gas bubbles of the inlet gas stream into smaller, dispersed gas bubbles, and a separation region where the enriched circulating liquid stream is separated into an enriched separated liquid stream and a lean separated gas stream, wherein the system removes over approximately 90% of the detrimental species from the inlet gas stream, providing the lean separated gas stream comprising less than approximately 10% of the detrimental species in the inlet gas stream.

In another preferred embodiment, the present invention is a system for selective absorption of a detrimental species from a detrimental species-rich inlet gas stream comprising a dispersed bubble reactor having a circulating liquid stream continually enriched with at least a portion of, and then stripped of at least a portion of, the detrimental species, the disbursed bubble reactor comprising a riser where a detrimental species-rich inlet gas stream contacts the circulating liquid stream, and at least a portion of the detrimental species being absorbed by the circulating liquid stream, the riser having a dispersion zone where the inlet gas stream combined with the circulating liquid stream form dispersed gas bubbles, a pre-salter cyclone, wherein the circulating liquid stream enriched with at least a portion of the detrimental species of the inlet gas stream is separated into an enriched separated liquid stream and a lean separated gas stream, and a standpipe where the enriched separated liquid stream from the cyclone is collected and becomes the circulating liquid stream, the system further comprising a regenerator for regenerating the circulating liquid stream, wherein when the circulating liquid stream becomes sufficiently saturated with the detrimental species, the detrimental species-rich circulating liquid stream is sent to the regenerator, and upon regeneration, returns a detrimental species-lean circulating liquid stream to the system.

These and other objects, features and advantages of the present invention will become more apparent upon reading the following specification in conjunction with the accompanying drawing figures.

BRIEF DESCRIPTION OF THE DRAWINGS

Various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
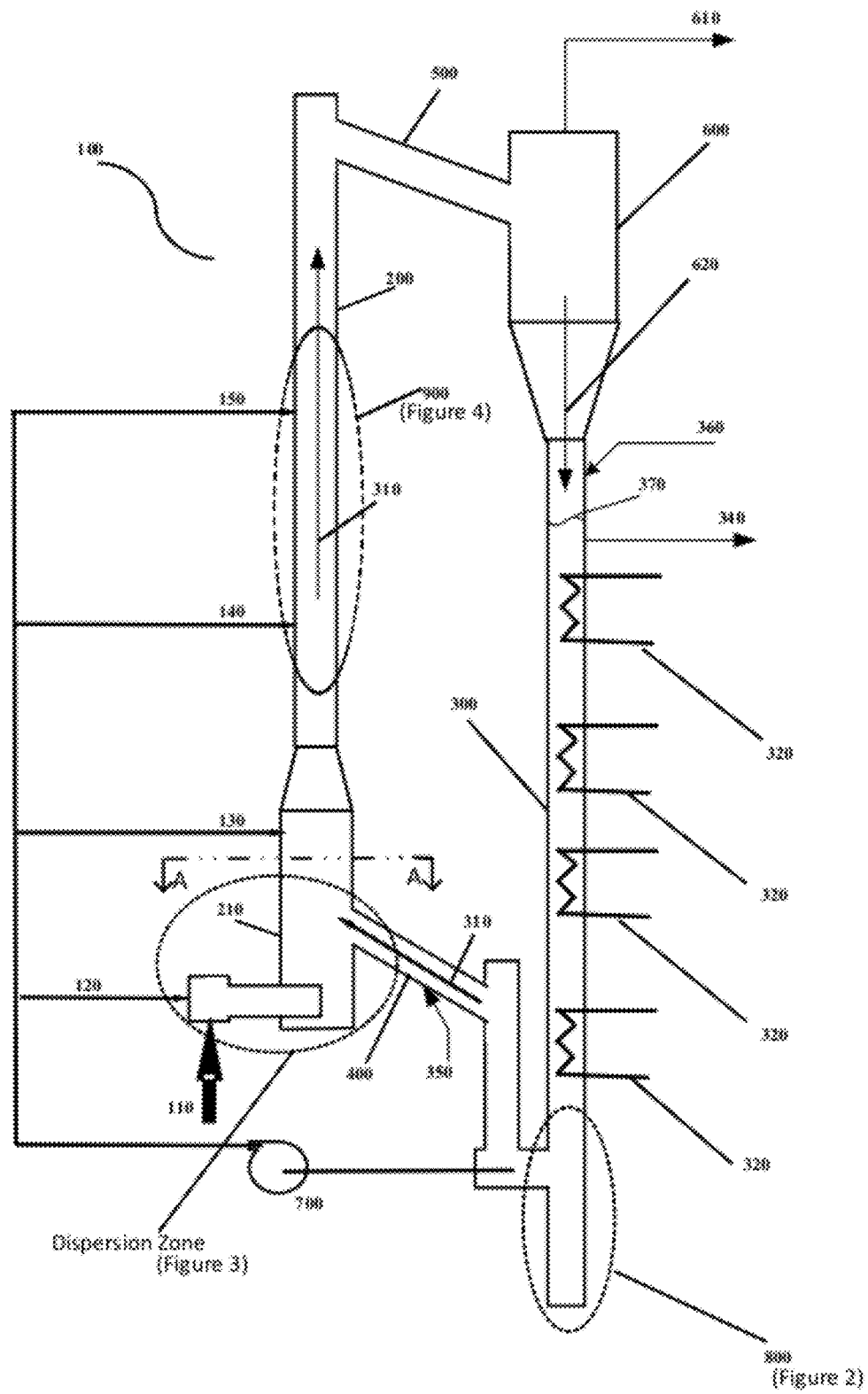
FIG. 1 is a schematic of the dispersed bubble reactor of the present invention, according to a preferred embodiment.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "essentially free" or "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

As used herein, the terms crystals, precipitates, particles, particulates and solids are used interchangeably.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

As shown in FIG. 1, the dispersed bubble reactor 100 comprises a riser 200, a standpipe 300, a transition seal 400, a downward sloping crossover 500 feeding a circulating stream into a presalter cyclone 600. A gas-liquid mixture in riser 200 is pre-separated by gravity in the inclined crossover 500, where the liquid portion primarily flows along the bottom surface of the crossover, and a gas portion flows above the liquid surface. The gas-liquid mixture is nearly completely separated in the presalter cyclone 600. The at least essentially liquid-free gas stream 610 leaves the cyclone 600 from the top, and the at least essentially gas-free liquid stream 620 flows downward under gravity into the standpipe 300. A finely dispersed gas contacts a circulating liquid solvent stream 310 in the riser 200, and the process continues as stream 310 enters the crossover 500.

In an exemplary embodiment, the transition seal 400 is non-mechanical valve, and the operation of the presalter cyclone 600 is disclosed, at least in respect to the gas-solids separation in U.S. Pat. No. 7,771,585, entitled "Method and Apparatus for the Separation of Gas-Solids Mixture in a Circulating Fluidized Bed Reactor," which is hereby fully incorporated by reference. Further, all publications, including but not limited to other patents and patent applications, cited herein are incorporated by reference as if each individual publication were specifically and individually indicated to be incorporated by reference herein as though fully set forth.

An inlet gas stream 110, in an exemplary embodiment comprising $CO_2$, initially bubbles through a liquid solution forming relatively large gas bubbles. The gas stream 110 initially contacts the circulating liquid solvent stream 310 in a bottom section of the riser 210, where the large bubbles form dispersed bubbles when the large bubbles are sheared by the liquid solvent flowing at a shearing velocity from the standpipe 300 through the non-mechanical valve (transition seal) 400.

The degree of dispersion of gas into fine bubbles depends mainly upon the shear velocity of the liquid solvent entering the riser bottom section 210. The two phase stream subsequently flows up through the riser 200, facilitating absorption of $CO_2$ in the gas into the liquid phase.

As the solvent circulates in the DBR loop, it becomes increasingly saturated with $CO_2$ due to absorption by the solvent with a simultaneous chemical reaction. To maintain the absorption capacity of the solvent in the DBR loop, a portion 340 of the gas-free liquid stream 620 from the top of the standpipe rich with $CO_2$ flows to a regenerator, and regenerated lean solvent 350 is returned to the DBR loop through the non-mechanical valve 400.

In an industrial application, the present invention preferably removes over approximately 90% of the $CO_2$ from the industrial process/effluent stream 110 (syngas rich stream), such that the separated gas stream 610 (or syngas lean stream) contains less than approximately 10% of the $CO_2$ of stream 110.

During a start-up, the standpipe 300 can be filled with a solvent stream 360 with an external pump (not shown). Stream 360 can enter the DBR loop at other times beyond start-up, as make-up when necessary.

$CO_2$ absorption into a reacting liquid solvent is exothermic. Thus, the temperature increase in riser 200 depends upon the rate at which the liquid circulates in the DBR riser and the exothermic reaction heat evolved upon absorption and reaction. The reaction heat can be removed from the circulating liquid solvent through cooling coils 320 embedded in the standpipe 300. For absorptions that are highly temperature sensitive, the temperature rise can be limited by injecting cooled solvent from the standpipe 300 to various locations in riser 200 through streams 120, 130, 140 and 150. An external pump 700 can provide the cooled solvent to the riser 200. Those of skill in the art will appreciate appropriate flow rates and numbers of streams, for example, to provide sufficient cooling. Streams 120, 130, 140 and 150 can also be used to generate counter current flows in different locations of riser 200 more fully disclosed below in reference to FIG. 4.

Relatively high liquid solvent level 370 in the standpipe 300 supplies the head necessary for the liquid to flow to riser 200 through the transition seal 400 at a desired velocity (shear velocity) to achieve appropriately high gas dispersion. The high degree of gas dispersion provided by the present invention results in large number of finer gas bubbles with the attendant large interfacial surface area that enhances mass transfer.

As there are no internals inside the DBR solvent circulating loop in an exemplary embodiment of the present invention, the present DBR is highly suitable for three phase systems that involve crystal formation (precipitates) and growth. When operating with aqueous ammonia solution, for example, high amounts of $CO_2$ absorption leads to the formation of ammonium bicarbonate crystals in the $CO_2$ absorber. The desire for high $CO_2$ absorption capacities with amino acid salt solutions also leads to crystal formation. Such solvents and operating conditions that in conventional systems lead to incipient crystal formation, growth and precipitation that cannot be tolerated, easily can be handled by the inventive DBR.

The present invention can be applied to various two phase and three phase systems normally encountered in a chemical industry. As in some systems where gas absorption followed by liquid phase reactions are catalyzed by circulating catalyst particles, the term solids or solid particles are used herein generically to include such catalyst particles in addition to crystals, precipitates and other such terms.

Figure 2:
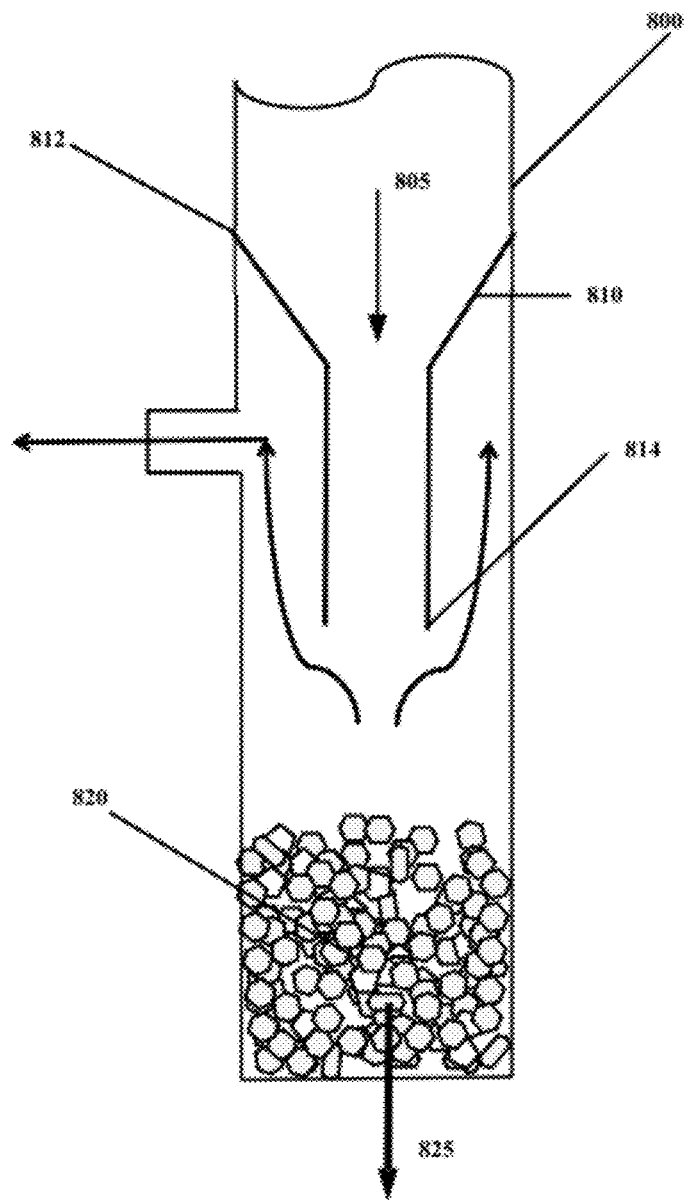
FIG. 2 illustrates an inertial solids (precipitates or crystals) concentrator at the bottom of a standpipe of a dispersed bubble reactor of the present invention, according to a preferred embodiment.

A solids (crystals/precipitates) concentrator 800 at the bottom of the standpipe 300 can separate a majority of the solids circulating either through inertial or centrifugal separation. FIG. 2 illustrates details of a solids concentrator 800 according to a preferred embodiment of the present invention. A liquid stream 805 flows through a restriction member 810, which can have a funnel shape with the upper end 812 connected to the standpipe wall and an outlet 814 in the center of the standpipe.

The diameter of outlet 814 can be much smaller than that of the standpipe. In a preferred embodiment, the diameter of the outlet 814 is less than the radius of the standpipe 300 so that the liquid exit velocity at the outlet 814 is at least four times larger than that in the standpipe. The relatively high liquid velocity accelerates the solids towards the bottom of the solids concentrator and accumulate in region 820.

Since the particle density of the solids is generally higher than the liquid, the solids settle at the bottom of the solids concentrator 800. Finer solids (crystals/precipitates) flow back to the riser and essentially act as seed crystals for further growth. In the case of systems where solid particles are catalysts, a lower portion of the standpipe 300 can be designed to circulate the solid catalyst particles back to the riser with minimal or no settling.

In $CO_2$ absorption systems, a concentrated slurry stream 825 can be pumped to the regenerator, and the lean solution flows back to the riser. Depending on the characteristics of the solvent and operating conditions, rich solvent stream 340 (shown in FIG. 1) from the top of the standpipe can be mixed with slurry stream 825 from the bottom of the standpipe. The mixture can then be sent for regeneration. As shown in FIG. 2, liquid solvent in the lower portion of the concentrator 800 flows upwards entering the transition seal 400 after disengaging larger solid particles to settling.

The transition seal 400 can be configured in different ways with the objective of achieving maximum resistance for the inlet gas stream 110 entering the lower portion of riser 200 to flow backwards into the standpipe 300. In a preferred embodiment, the transition seal/non-mechanical valve comprises horizontal, vertical and inclined sections. Those of skill in the art will understanding other types of non-mechanical valves can be used for this purpose. A key to limit/prevent the reverse flow of gas is the elevation of the inlet gas stream 110. The elevation preferably is above the bottom of the standpipe (inlet to transition seal 400). The static head between the gas inlet and the bottom of the standpipe should be larger than the expected pressure fluctuation in the riser 200.

For start-up purposes, a gate valve (not shown) can be provided to the inclined or the vertical portion of the transition seal 400 to better ensure initial bubbling of gas occurs along the riser 200. This can also be achieved by injecting gas during start-up at upper elevations of the riser. Once the bubbling of gas in the riser is initiated, then the density difference between the standpipe 300 and riser 200 will induce liquid solvent circulation in the DBR loop.

As operating scenarios demand (turn-down, for example), the gate valve on the inclined portion of the non-mechanical valve 400 also is useful to vary liquid circulation rates and liquid-to-gas flow rate (L/G) ratios in riser 200 without changing the inventory or static height of liquid in the standpipe.

The gas-liquid region, or dispersion zone, 210 at the bottom of riser 200 functions as a dispersed bubble generator. Returning to FIG. 1, in a preferred embodiment of the present invention, the diameter of the dispersion zone 210 is substantially larger than that of the riser 200. A diameter ratio of dispersion zone 210 to riser 200 preferably can be in a range of approximately 1.2 to 5, and more preferably in a range of approximately 3 to 5 for most systems so the gas velocity is relatively slower. As such, sufficient residence time for the gas phase in the dispersion zone is provided, and thus the liquid shear flow can break the large gas bubbles into finely dispersed bubbles.

Figure 3:
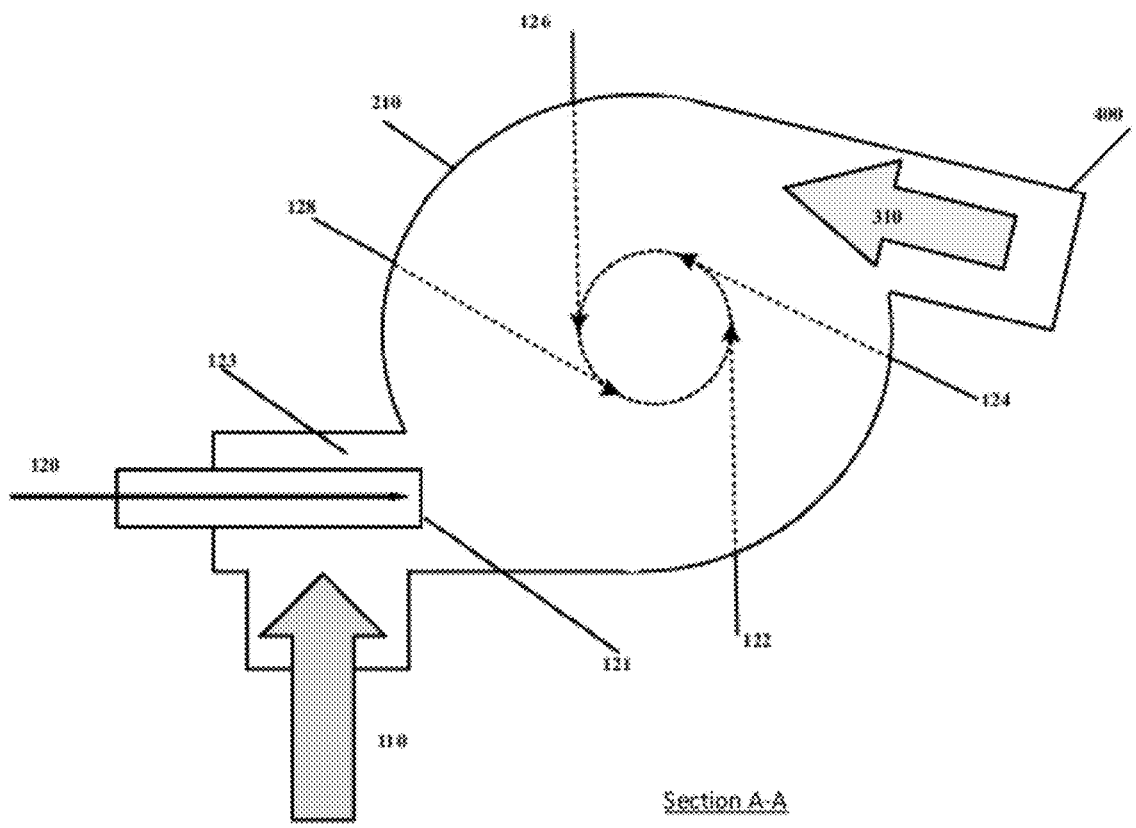
FIG. 3 illustrates a plan view of the gas and liquid inlets in a dispersion zone of a lower riser of a dispersed bubble reactor of the present invention, according to a preferred embodiment.

FIG. 3 illustrates a preferred embodiment of the gas-liquid flows in the dispersion zone. The inlet gas stream 110 flows into an annular region 123 of the non-mechanical valve (transition seal) 400 at the entrance, and is inducted by cooled solvent liquid stream 120 when the gas stream pressure drop is limited—such as in the application of $CO_2$ absorption from the pulverized coal combustion plant flue gases. The mass flow rate of the cooled solvent liquid stream 120 is greater than or equal to the gas mass flow rate. The liquid exit velocity at nozzle tip 121 is approximately 1.2 times higher than the gas velocity in the annular region 123. The gas and liquid streams general flow direction at the inlet of the dispersion zone 210 is tangential to the wall of the lower section of the riser. Although only one set of gas and liquid stream inlets are shown in FIG. 3, multiple entrances of the gas and liquid streams with similar arrangements as streams 110 and 120 can be beneficial. Additional gas and liquid stream inlets can be installed at different elevations along the height of the dispersion zone. Furthermore, each elevation can have more than one set of gas and liquid stream inlets.

In addition, the circulating liquid solvent stream 310 in riser 200 can also enter the dispersion zone at different elevations to aid in dispersing the large gas bubbles into finer bubbles. In a preferred embodiment, the mass flow rate of liquid stream 310 can be approximately 10 to 100 times higher than that of the gas phase. Even if the liquid streams (such as cooled solvent liquid stream 120) from various inlet nozzles and the transition seal (such as 310) have different entrances to the dispersion zone 210, the liquid mass flow rate at each entrance is still much higher than the gas mass flow rate. In a preferred embodiment, a key to determining the liquid circulation rates or any additional pump capacity that may be necessary is to ensure that in the dispersion zone, the gas phase is well dispersed in the continuous liquid phase.

In another exemplary embodiment of the present invention, as shown in FIG. 3, four additional liquid jet streams 122, 124, 126 and 128 at various levels and with vectors normal to a flow circle inside the dispersion zone are installed to increase the gas and liquid phase rotation. Although these streams from a pump (not shown) are tangential to the contrived circle in the center, the liquid jet nozzles preferably are flush with the wall, and do not project inside the lower riser. Depending upon the degree of dispersion desired and the diameter of the lower riser in a commercial configuration, these additional liquid jets also can be installed at different elevations with the group of nozzles, and at each elevation aiming at different diameters of the imaginary circular plane in the dispersion zone.

Figure 4:
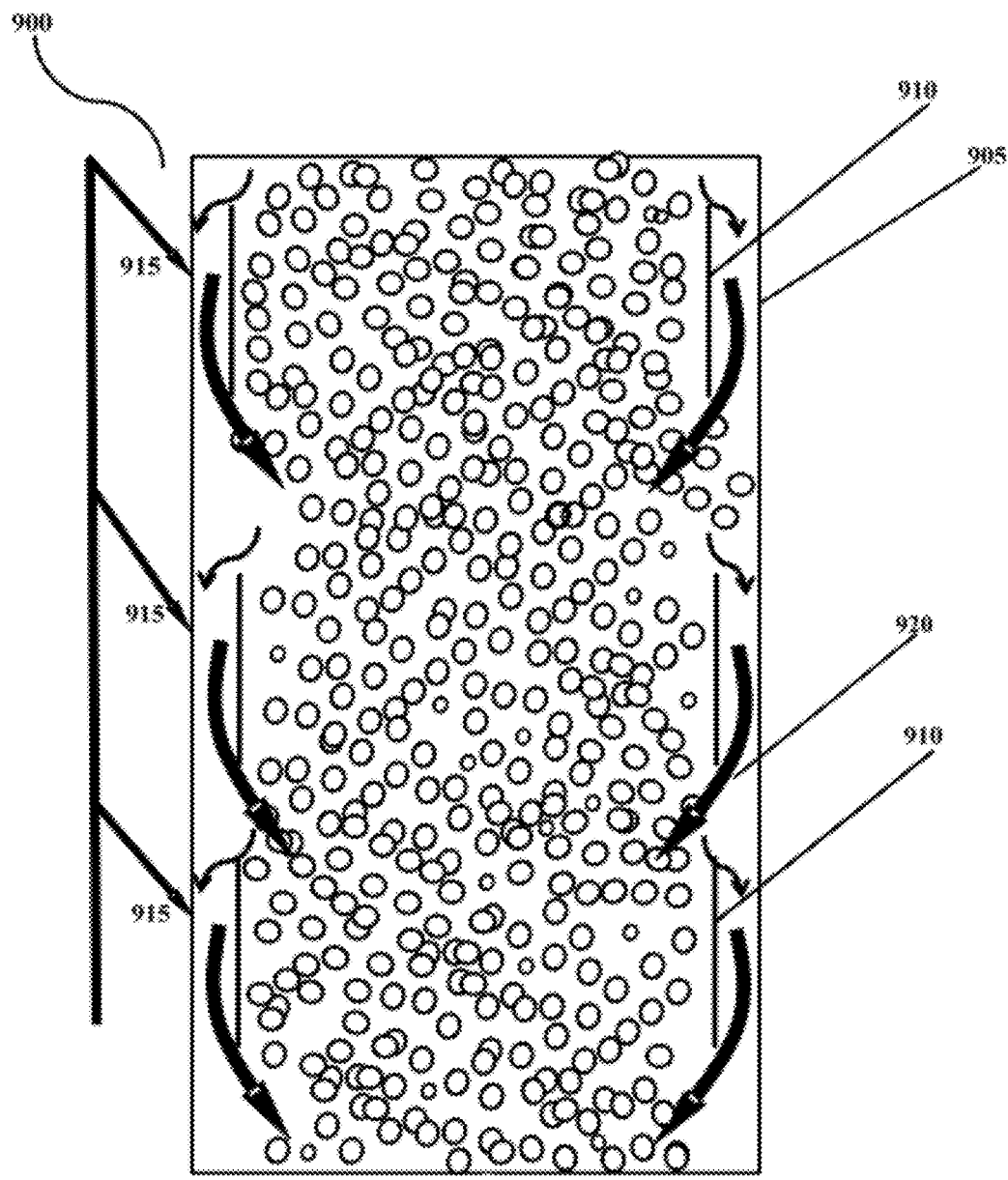
FIG. 4 illustrates a multistage counter-current flow in a dispersed bubble reactor of the present invention, according to a preferred embodiment

For solvents that have extremely high heat of reaction or have relatively low absorption capacity, yet another exemplary embodiment of the present invention, as shown in FIG. 4, the riser 200 is provided with sections of pseudo-counter current flows. In section 900 of riser 200, a number of cylindrical members 910 can be installed so that the riser walls 905 and 910 form an annular region in which the solvent is directed downward and circumferentially injected into the core region of an upward flowing liquid stream containing dispersed gas.

The preferred diameter ratio of inner cylinder 910 to the riser wall 905 is between approximately 0.89 and 0.95 so that the area occupied by the annular region will be approximately 10% to 20% of the riser cross-sectional area. The height of the inner cylinder 910 can be greater than one meter so the downward flowing annular liquid stream 920 acquires a velocity greater than approximately 3 meters per second (m/s). The gap between one section of the inner cylindrical pipe 910 and another section below should be larger than the width of the annular region to limit or avoid the liquid flowing directly from the upper annular region to the one immediately below it.

The downward flowing liquid in the annular region also gains additional momentum from solvent stream 915 that can be pumped from fresh regenerated solution from the regenerator (not shown) or from the bottom of the standpipe. Although only one solvent stream 915 per annular region is illustrated in FIG. 4, it will be understood by those of skill in the art that the stream 915 can enter the annular region of each section through multiple nozzles, preferably more than four on each level. Further, the jets preferably are generally pointed downward with an inclined angle greater than 45° to the horizontal plane.

The flow rate of each stream 915 will depend on the height and diameter ratio of the inner cylinder 910. A preferred flow rate ensures that the momentum of the downward component of a jet is greater than the friction force generated by the liquid flow. As a result, the entire liquid head due to the density difference between the core (with finely dispersed gas bubbles) and the annular region is utilized for the kinetic energy of the annular liquid stream.

Liquid stream 920 flowing from the annular region into the upward flowing liquid stream containing dispersed gas has two important functions, among others: further disperse the gas bubbles, and enhance absorption of $CO_2$ from the gas stream. To those of skill in the art, the annular stream will be understood as similar in concept to a countercurrent flow scheme in tray columns with the gas stream generally flowing upwards and the liquid stream from the downcomer flowing across the gas stream.

High gas dispersion, high gas velocities (high throughputs), and the ability to handle solids all patentably distinguish the present DBR from conventional mass transfer devices. The present invention is suitable to process high volumes of gas typical found in large scale IGCC and PCC power plant flue gas applications to separate $CO_2$ from the gas stream. The present DBR also is equally suitable to process many gas-liquid chemical process systems that involve solid particles in the form of catalysts or precipitates.

EXAMPLE

Described below is one non-limiting example of an exemplary embodiment of the disclosure. None of the descriptions, ranges, or other information in this example limit the scope and operation of the present invention. The hydrodynamics of the DBR riser in FIG. 1 was tested up to 480 pounds per square inch gauge (psig) and by varying the riser superficial gas velocities from 3 to 35 ft/s. The DBR operation was characterized using pressure drop, gas hold-up, liquid circulation rates, and flow regimes. The tests showed that using the static head in the standpipe as the driving force, the circulating liquid and the gas stream entering the riser could produce a stable dispersed bubble flow regime in the riser with the creation of a large interfacial area for gas-liquid contact.

For a particular pilot test apparatus, the liquid circulation rate varied with the gas flow rate in the riser and reached a maximum at 10 ft/s, as predicted. The bulk density in the riser was in the range of approximately 15 to 42 pound per cubic foot ($lb/ft^3$), and the gas void fraction was in the range of approximately 0.32 to 0.76. Even at such high void fractions, the riser pressure fluctuations indicated a stable dispersed bubble regime.

The hydrodynamics of the DBR was also tested by circulating slurry with 160 microns (mass mean diameter) solid particles (representing precipitates/catalyst particles in the process) up to 50% by weight in the test DBR apparatus. The slurry entered the riser through the non-mechanical valve and was lifted by the gas injected into the riser bottom. The density difference between the solutions in the standpipe and riser allowed the slurry to enter the lower riser to disperse the large gas bubbles and evenly distribute the finer gas bubbles in the slurry phase using its turbulence energy. The fine gas bubbles in the riser agitated the solid particles, causing a well mixed three phase flow to develop along the riser.

Tests showed that the slurry system had a much higher gas holdup than the two phase gas-liquid systems at similar superficial liquid velocities. Also, at similar standpipe levels, the slurry system had higher superficial downward flow velocities in the standpipe. As long as the flow capacity of the presalter cyclone separator was not exceeded, the presalter cyclone was approximately 100% effective in separating the gas from the slurry. As the standpipe level increased, the slurry entered the riser at higher velocities and with higher turbulent energies to disperse the gas bubbles. Based on tests, the transition gas velocity from the dispersed bubble to turbulent regime will be much higher for commercial reactors with levels in the standpipe greater than 600 inches.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A dispersed bubble reactor for selective absorption of a gas phase constituent into the liquid phase operating at a dispersed bubble flow regime comprising:
    a riser where an inlet gas stream rich with a gas phase constituent contacts a circulating liquid stream comprising the gas phase constituent, wherein in the riser, at least a portion of the gas phase constituent is absorbed into a liquid phase, the riser having a dispersion zone where the inlet gas stream combined with the circulating liquid stream form dispersed gas bubbles;
    a cyclone, wherein the circulating liquid stream with the gas phase constituent from the riser is separated into a separated liquid stream and a separated gas stream;
    a standpipe where the separated liquid stream from the riser is collected, the standpipe having a bottom portion for concentrating solid precipitates;
    a non-mechanical valve connecting the standpipe with the riser; and
    a riser crossover connecting the riser with the cyclone;
    wherein the reactor is adapted such that liquid velocities entering the dispersion zone of the riser generate a shearing force for dispersion of larger as bubbles of the inlet as stream into the smaller, dispersed gas bubbles, and the degree of dispersion is controllable by controlling the static head of the liquid column in the standpipe; and
    wherein the reactor is adapted such that in the dispersion zone, liquid flow from tangentially entering jets form a rotating pool of the circulating liquid stream generates enough shear force to break the larger gas bubbles of the inlet gas stream into the smaller, dispersed bubbles in the mean range of approximately 100 to 500 microns in size.

2. The dispersed bubble reactor of claim 1, wherein when the gas phase constituent is $CO_2$, the reactor is adapted to remove over approximately 90% of the $CO_2$ in the inlet gas stream, such that the separated gas stream comprises less than approximately 10% $CO_2$ in the inlet gas stream.

3. The dispersed bubble reactor of claim 1, wherein when the gas phase constituent is $CO_2$, the reactor is adapted to remove over approximately 90% of the $CO_2$ in the inlet gas stream, such that the separated liquid stream returning to the standpipe from the cyclone contains the absorbed $CO_2$ from the inlet gas stream.

4. The dispersed bubble reactor of claim 1, wherein the reactor is adapted such that the inlet gas stream enters the riser with a velocity in the range of approximately 10-40 ft/s, and the circulating liquid stream with the gas phase constituent moves through the riser at a velocity in the range of approximately 12-30 ft/s.

5. The dispersed bubble reactor of claim 1, wherein the dispersion zone of the riser is located at the bottom of the riser, and is a portion of the riser having a larger diameter than higher regions of the riser, such that the ratio of diameters of the dispersion zone section of the riser to the higher regions of the riser is in the range of approximately 1.2 to 5.

6. The dispersed bubble reactor of claim 1, wherein the reactor is adapted such that in the dispersion zone the dispersed gas bubbles mix in the circulating liquid stream with a void fraction in the range of approximately 0.2 to 0.8.

7. The dispersed bubble reactor of claim 6, wherein the reactor is adapted such that the void fraction reduces the density of the circulating liquid stream with the gas phase constituent in the riser, thus increasing the density difference between the material in the standpipe and riser, further complementing the driving force circulating the circulating liquid stream in the reactor.

8. The dispersed bubble reactor of claim 1, wherein the circulating liquid stream with the gas phase constituent in the riser has a liquid-to-gas flow rate ratio in the range of approximately 10 to 100.

9. The dispersed bubble reactor of claim 1 further comprising a heat adjustment system to provide controlled reactor temperature by adding or removing heat from the circulating liquid stream.

10. The dispersed bubble reactor of claim 1, wherein the reactor is adapted such that the circulating liquid stream comprises solid particles in the form of precipitates formed during the absorption process of a three phase dispersed bubble flow regime operation, wherein the precipitates in the circulating liquid stream enhance dispersion, wherein at least a portion of the precipitates collect in the bottom portion of the standpipe, and wherein concentrated slurry of precipitated solid particles flows to a regenerator to become a regenerated lean solvent stream.

11. The dispersed bubble reactor of claim 10, wherein the reactor is adapted such that the regenerated lean solvent stream from the regenerator is injected into the non-mechanical valve to be recirculated into the riser.

12. The dispersed bubble reactor of claim 1, wherein the riser is provided with annular regions, the dispersed bubble reactor further comprising downwardly-inclined liquid solvent jets injecting solvent streams into the annular region with sufficient momentum to overcome the friction force between the rising circulating liquid stream comprising the gas phase constituent and walls that form the annular region, wherein the liquid solvent streams from the downwardly-inclined liquid solvent jets generate a countercurrent flow effect in the riser, increasing the $CO_2$ absorption efficiency.

13. A dispersed bubble reactor comprising:
    a riser having a dispersion zone;
    a cyclone in fluid communication with the riser; and
    a standpipe in fluid communication with the cyclone and the riser;
    wherein the dispersion zone of the riser is located at the bottom of the riser, and is a portion of the riser having a larger diameter than higher regions of the riser, such that the ratio of diameters of the dispersion zone section of the riser to the higher regions of the riser is in the range of approximately 1.2 to 5.

14. The dispersed bubble reactor of claim 13 further comprising:
   a valve located between the standpipe and the riser; and
   a riser crossover c located between the riser and the cyclone.

15. The dispersed bubble reactor of claim 14, the dispersed bubble reactor for selective absorption of a gas phase constituent into the liquid phase operating at a dispersed bubble flow regime;
   wherein the riser is dimensioned such that an inlet gas stream rich with a gas phase constituent can contact a circulating liquid stream comprising the gas phase constituent, wherein the riser further dimensioned such that in the riser, at least a portion of the gas phase constituent can be absorbed into a liquid phase, wherein the dispersion zone is dimensioned such than the inlet gas stream can combine with the circulating liquid stream to form dispersed gas bubbles;
   wherein the cyclone is dimensioned such that the circulating liquid stream with the gas phase constituent from the riser can be separated into a separated liquid stream and a separated gas stream; and
   wherein the standpipe is dimensioned such that the separated liquid stream from the riser can be collected, the standpipe having a bottom portion for concentrating solid precipitates.

16. The dispersed bubble reactor of claim 15, wherein the valve comprises a non-mechanical valve.

17. The dispersed bubble reactor of claim 13 further comprising solvent jets.

18. The dispersed bubble reactor of claim 17, wherein the solvent jets comprise downwardly-inclined solvent jets positioned to inject solvent streams into the riser.

19. The dispersed bubble reactor of claim 17, wherein the riser is provided with annular regions; and
   wherein the solvent jets comprise downwardly-inclined solvent jets positioned to inject solvent streams into the annular regions of the riser.

20. The dispersed bubble reactor of claim 13 further comprising a heat adjustment system to provide controlled reactor temperature.

21. The dispersed bubble reactor of claim 15, wherein the riser is provided with annular regions, the dispersed bubble reactor further comprising downwardly-inclined liquid solvent jets injecting solvent streams into the annular region with sufficient momentum to overcome the friction force between the rising circulating liquid stream comprising the gas phase constituent and walls that form the annular region, wherein the liquid solvent streams from the downwardly-inclined liquid solvent jets generate a countercurrent flow effect in the riser, increasing the $CO_2$ absorption efficiency.

22. A dispersed bubble reactor for selective absorption of a gas phase constituent into the liquid phase operating at a dispersed bubble flow regime comprising:
   a riser where an inlet gas stream rich with a gas phase constituent contacts a circulating liquid stream comprising the gas phase constituent, wherein in the riser, at least a portion of the gas phase constituent is absorbed into a liquid phase, the riser having a dispersion zone where the inlet gas stream combined with the circulating liquid stream form dispersed gas bubbles;
   a cyclone, wherein the circulating liquid stream with the gas phase constituent from the riser is separated into a separated liquid stream and a separated gas stream;
   a standpipe where the separated liquid stream from the riser is collected, the standpipe having a bottom portion for concentrating solid precipitates;
   a non-mechanical valve connecting the standpipe with the riser; and
   a riser crossover connecting the riser with the cyclone;
   wherein the dispersion zone of the riser is located at the bottom of the riser, and is a portion of the riser having a larger diameter than higher regions of the riser, such that the ratio of diameters of the dispersion zone section of the riser to the higher regions of the riser is in the range of approximately 1.2 to 5.

23. A dispersed bubble reactor for selective absorption of a gas phase constituent into the liquid phase operating at a dispersed bubble flow regime comprising:
   a riser where an inlet gas stream rich with a gas phase constituent contacts a circulating liquid stream comprising the gas phase constituent, wherein in the riser, at least a portion of the gas phase constituent is absorbed into a liquid phase, the riser having a dispersion zone where the inlet gas stream combined with the circulating liquid stream form dispersed gas bubbles;
   a cyclone, wherein the circulating liquid stream with the gas phase constituent from the riser is separated into a separated liquid stream and a separated gas stream;
   a standpipe where the separated liquid stream from the riser is collected, the standpipe having a bottom portion for concentrating solid precipitates;
   a non-mechanical valve connecting the standpipe with the riser; and
   a riser crossover connecting the riser with the cyclone;
   wherein the reactor is adapted such that in the dispersion zone the dispersed gas bubbles mix in the circulating liquid stream with a void fraction in the range of approximately 0.2 to 0.8.

24. A dispersed bubble reactor for selective absorption of a gas phase constituent into the liquid phase operating at a dispersed bubble flow regime comprising:
   a riser where an inlet gas stream rich with a gas phase constituent contacts a circulating liquid stream comprising the gas phase constituent, wherein in the riser, at least a portion of the gas phase constituent is absorbed into a liquid phase, the riser having a dispersion zone where the inlet gas stream combined with the circulating liquid stream form dispersed gas bubbles;
   a cyclone, wherein the circulating liquid stream with the gas phase constituent from the riser is separated into a separated liquid stream and a separated gas stream;
   a standpipe where the separated liquid stream from the riser is collected, the standpipe having a bottom portion for concentrating solid precipitates;
   a non-mechanical valve connecting the standpipe with the riser; and
   a riser crossover connecting the riser with the cyclone;
   wherein the circulating liquid stream with the gas phase constituent in the riser has a liquid-to-gas flow rate ratio in the range of approximately 10 to 100.

25. A dispersed bubble reactor for selective absorption of a gas phase constituent into the liquid phase operating at a dispersed bubble flow regime comprising:
   a riser where an inlet gas stream rich with a gas phase constituent contacts a circulating liquid stream comprising the gas phase constituent, wherein in the riser, at least a portion of the gas phase constituent is absorbed into a liquid phase, the riser having a dispersion zone where the inlet gas stream combined with the circulating liquid stream form dispersed gas bubbles;
   a cyclone, wherein the circulating liquid stream with the gas phase constituent from the riser is separated into a separated liquid stream and a separated gas stream;

a standpipe where the separated liquid stream from the riser is collected, the standpipe having a bottom portion for concentrating solid precipitates;

a non-mechanical valve connecting the standpipe with the riser; and a riser crossover connecting the riser with the cyclone;

wherein the riser is provided with annular regions, the dispersed bubble reactor further comprising downwardly-inclined liquid solvent jets injecting solvent streams into the annular region with sufficient momentum to overcome the friction force between the rising circulating liquid stream comprising the gas phase constituent and walls that form the annular region, wherein the liquid solvent streams from the downwardly-inclined liquid solvent jets generate a countercurrent flow effect in the riser, increasing the $CO_2$ absorption efficiency.

* * * * *